(12) United States Patent
Souder et al.

(10) Patent No.: US 9,981,502 B2
(45) Date of Patent: May 29, 2018

(54) MOTORCYCLE WHEEL RAMP

(71) Applicant: Intuitive Research and Technology Corporation, Huntsville, AL (US)

(72) Inventors: Jeffrey Kent Souder, Owens Cross Roads, AL (US); ALexis Henry Clark, Huntsville, AL (US)

(73) Assignee: Intuitive Resarch and Technology Corporation, Huntsville, AL (US)

( * ) Notice: Subject to any disclaimer, the term of this patent is extended or adjusted under 35 U.S.C. 154(b) by 219 days.

(21) Appl. No.: 14/594,231

(22) Filed: Jan. 12, 2015

(65) Prior Publication Data
US 2016/0200140 A1 Jul. 14, 2016

(51) Int. Cl.
| B66F 7/24 | (2006.01) |
| B60B 29/00 | (2006.01) |
| B60B 30/02 | (2006.01) |
| B60B 30/10 | (2006.01) |

(52) U.S. Cl.
CPC .......... *B60B 29/001* (2013.01); *B60B 29/002* (2013.01); *B60B 30/02* (2013.01); *B60B 30/10* (2013.01); *B66F 7/243* (2013.01)

(58) Field of Classification Search
CPC .... B66F 7/243; B66F 7/24; B66F 5/00; B66F 5/025; B66F 3/08
USPC ......................................... 254/2 B, 7 C, 8 R
See application file for complete search history.

(56) References Cited

U.S. PATENT DOCUMENTS

| 1,819,450 | A | * | 8/1931 | Weller | B66F 7/243 |
| | | | | | 254/88 |
| 2,232,903 | A | * | 2/1941 | Day | B66F 7/243 |
| | | | | | 254/88 |
| 2,264,979 | A | * | 12/1941 | Jackson | B66F 5/025 |
| | | | | | 254/8 B |
| 3,209,740 | A | * | 10/1965 | Hauch | F41B 5/066 |
| | | | | | 124/25.7 |
| 4,013,268 | A | * | 3/1977 | Williams | B66F 7/243 |
| | | | | | 254/88 |
| 4,119,327 | A | * | 10/1978 | Emerson | B62H 1/04 |
| | | | | | 280/293 |
| 5,348,438 | A | | 9/1994 | Roberts | |
| 6,095,746 | A | | 8/2000 | Bergin | |
| 6,241,104 | B1 | | 6/2001 | Kraus | |
| 6,455,869 | B1 | | 9/2002 | Cook | |
| 6,488,157 | B2 | | 12/2002 | Chen | |
| 6,575,310 | B2 | * | 6/2003 | Chamoun | B66F 3/08 |
| | | | | | 211/17 |
| 6,836,942 | B2 | | 1/2005 | Oleski | |

(Continued)

Primary Examiner — Christopher M Koehler
Assistant Examiner — Tyrone V Hall, Jr.
(74) Attorney, Agent, or Firm — Angela Holt; Frank M. Caprio; Bradley Arant Boult Cummings LLP

(57) ABSTRACT

A wheel ramp is provided for use with a motorcycle stand. The wheel ramp includes a pair of side plates, each of which has a first side end and a second side end distal thereto. At least one of the side plates has a curved end about the first side end to secure onto a portion of the motorcycle stand. The wheel ramp includes a top plate secured between the pair of side plates and an adjustable height mechanism configured to adjust the height of the second end of the side plates and thus adjust the height of the top plate about the second end. The top plate when moved under the wheel of the motorcycle is movable to engage and lift the wheel of the motorcycle into and out of engagement with the motorcycle.

14 Claims, 11 Drawing Sheets

(56) References Cited

U.S. PATENT DOCUMENTS

| | | | | |
|---|---|---|---|---|
| 7,070,540 B1* | 7/2006 | Priester | .................... | A63B 5/16 |
| | | | | 14/69.5 |
| 7,100,928 B1* | 9/2006 | VanValkenburgh | .... | B66F 3/005 |
| | | | | 280/163 |
| 7,150,359 B1 | 12/2006 | Lyons et al. | | |
| 7,467,436 B1* | 12/2008 | Jones | .................... | E04F 11/002 |
| | | | | 14/69.5 |
| 7,708,244 B2* | 5/2010 | Hickerson | ................. | B66F 3/12 |
| | | | | 248/188.2 |
| 7,988,402 B2 | 8/2011 | Adams | | |
| 8,684,278 B2* | 4/2014 | Brown, Jr. | .............. | B60B 39/12 |
| | | | | 238/14 |
| 8,720,522 B2* | 5/2014 | Combs | ................. | B60B 29/001 |
| | | | | 157/1.1 |
| 2009/0057635 A1* | 3/2009 | Klco | ....................... | B66F 5/025 |
| | | | | 254/7 R |

* cited by examiner

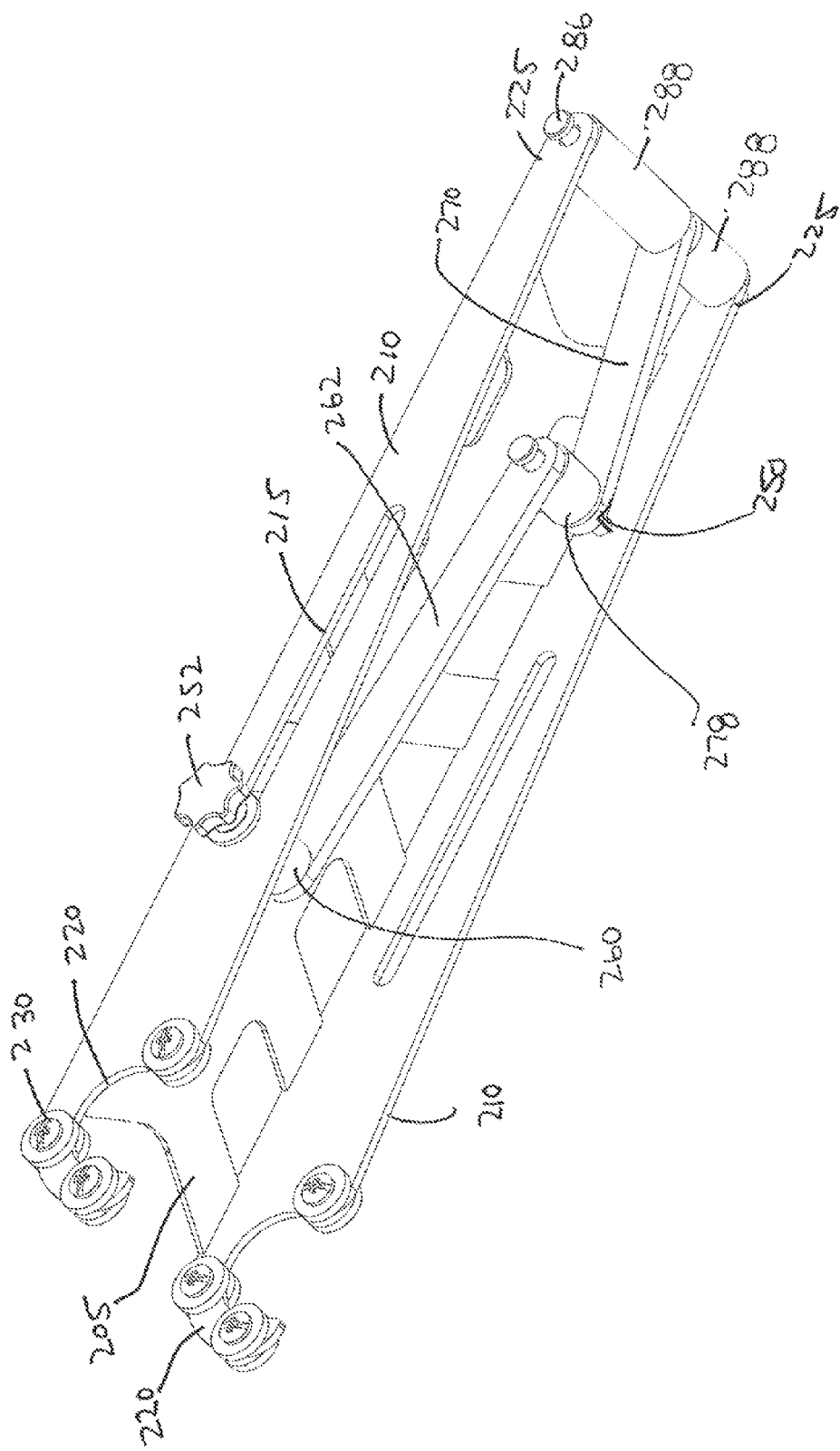

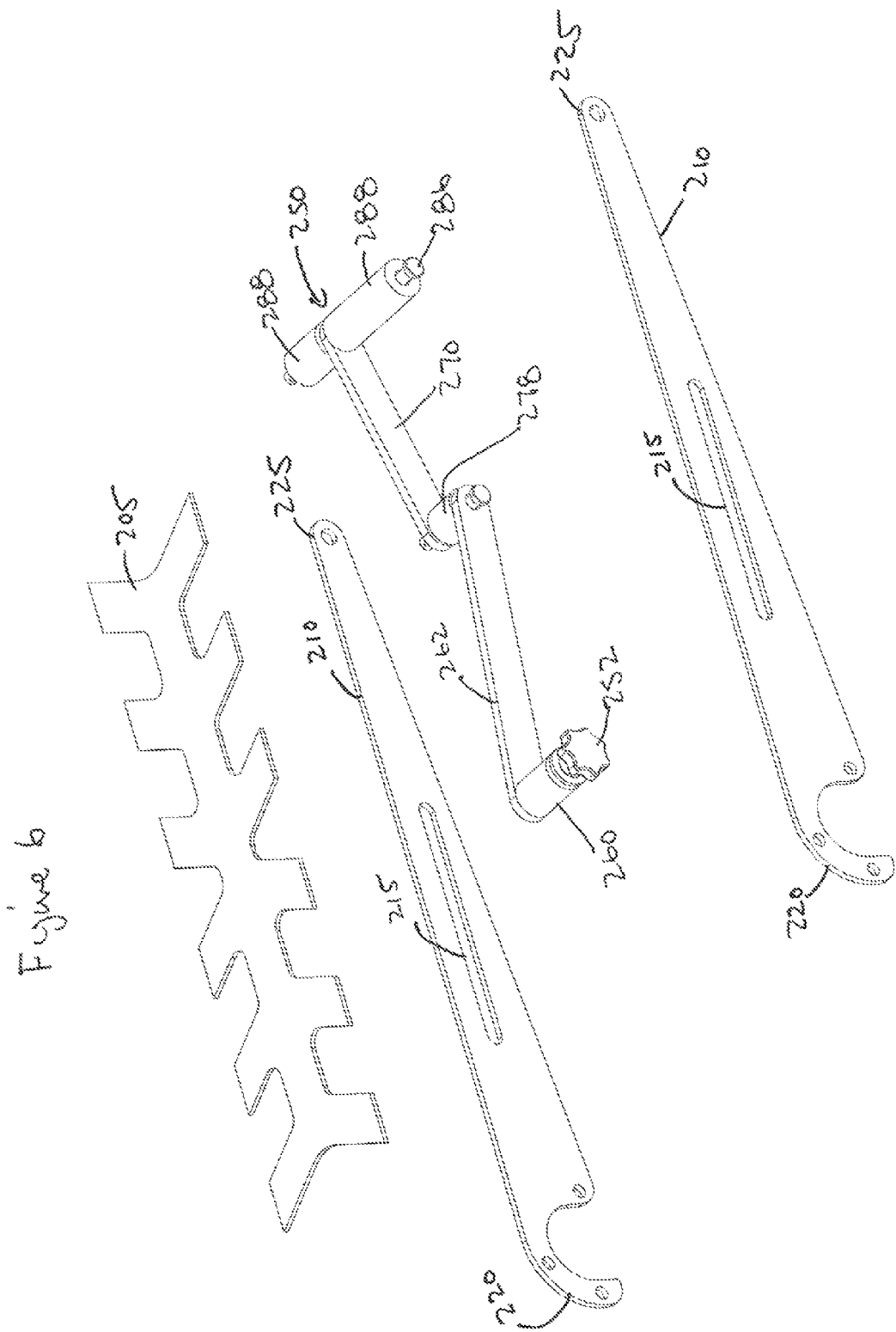

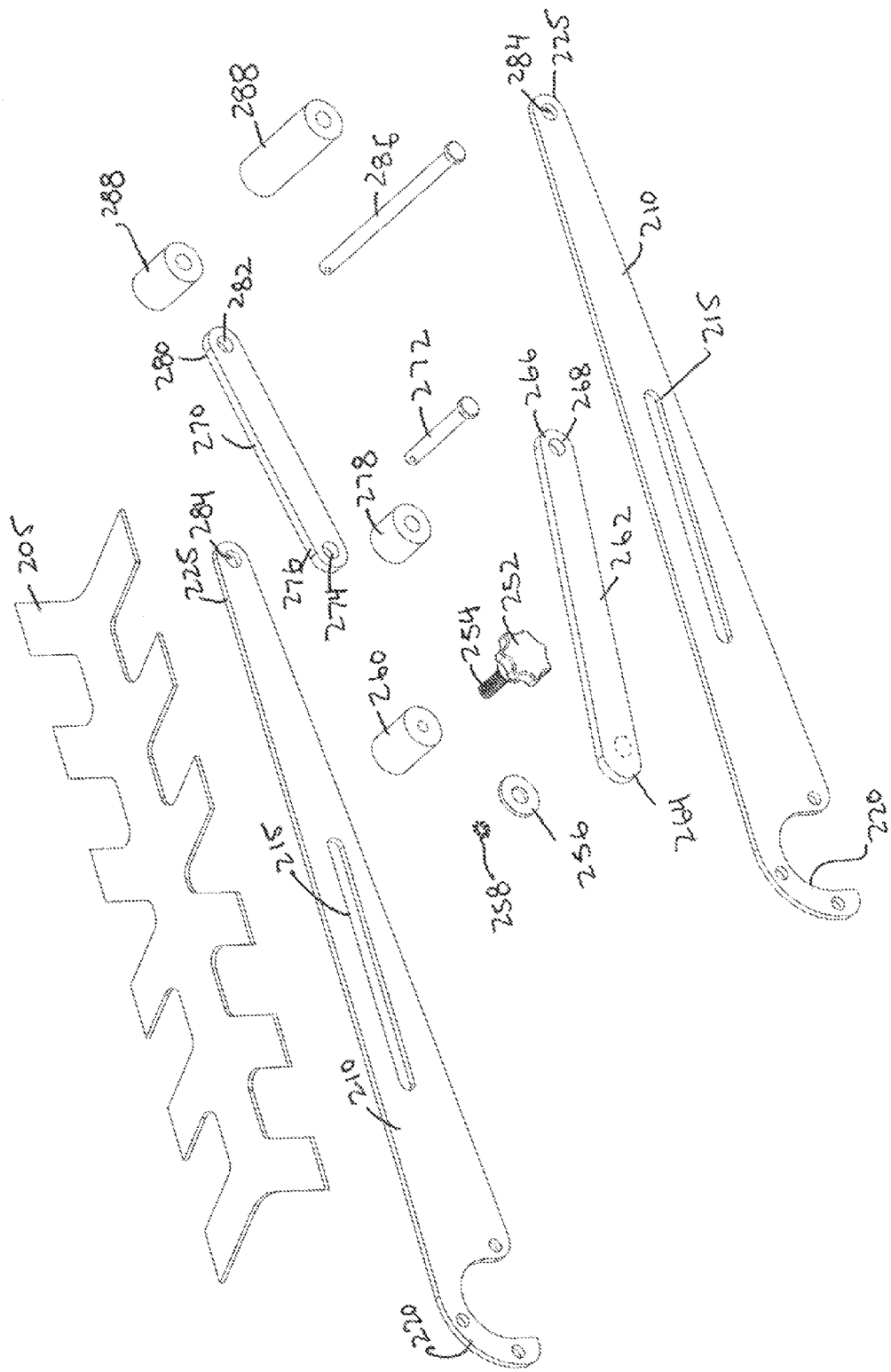

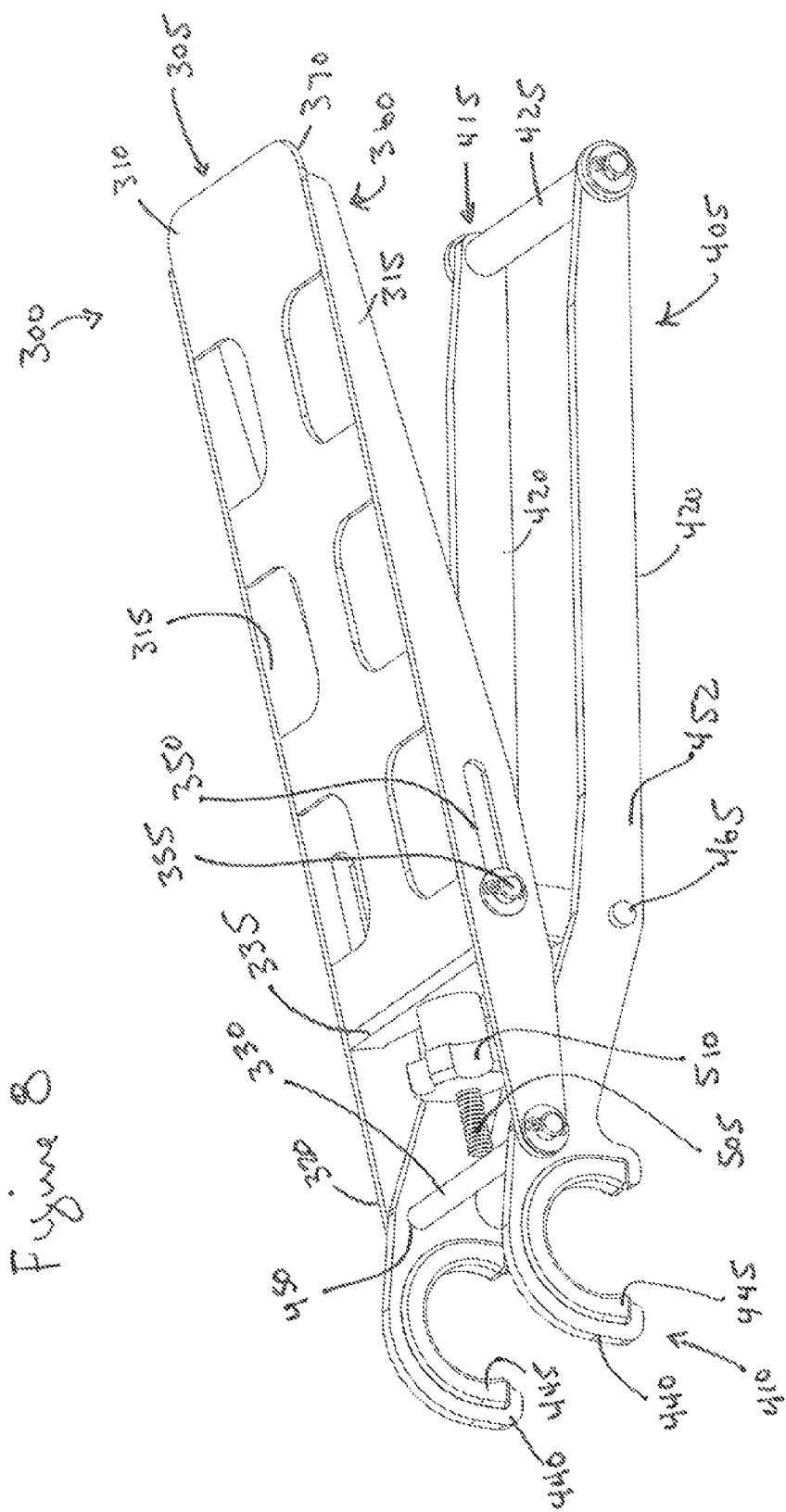

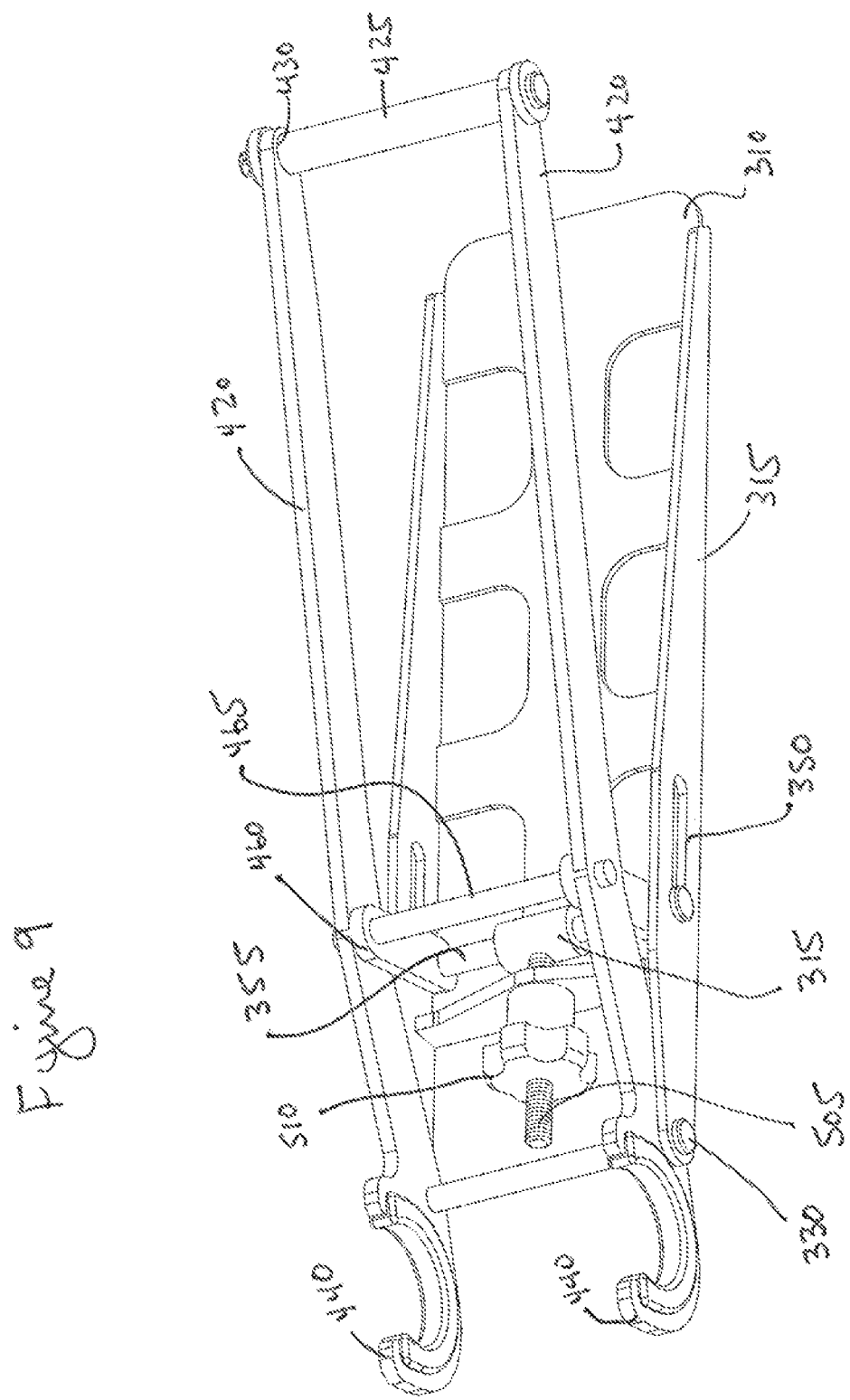

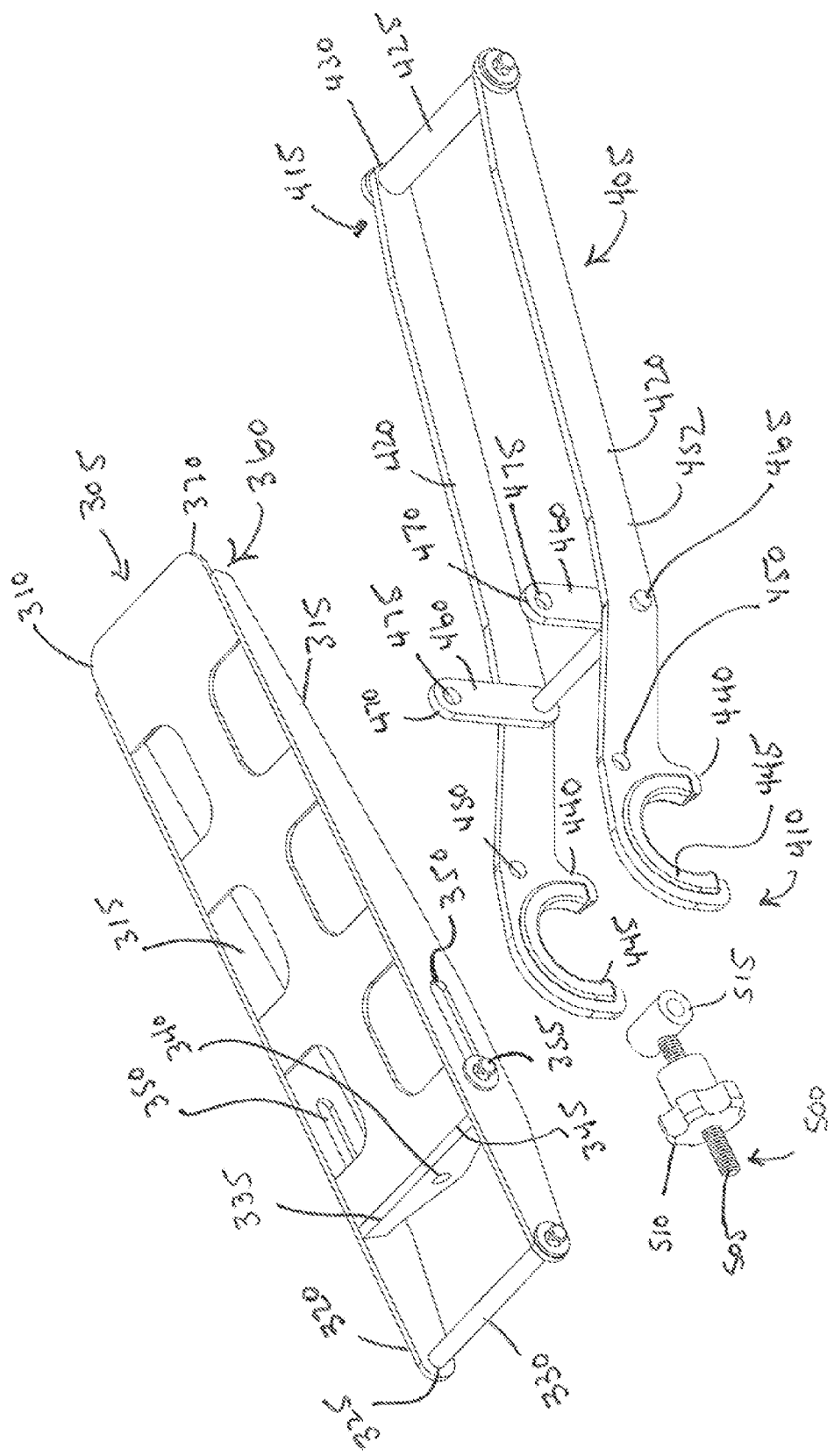

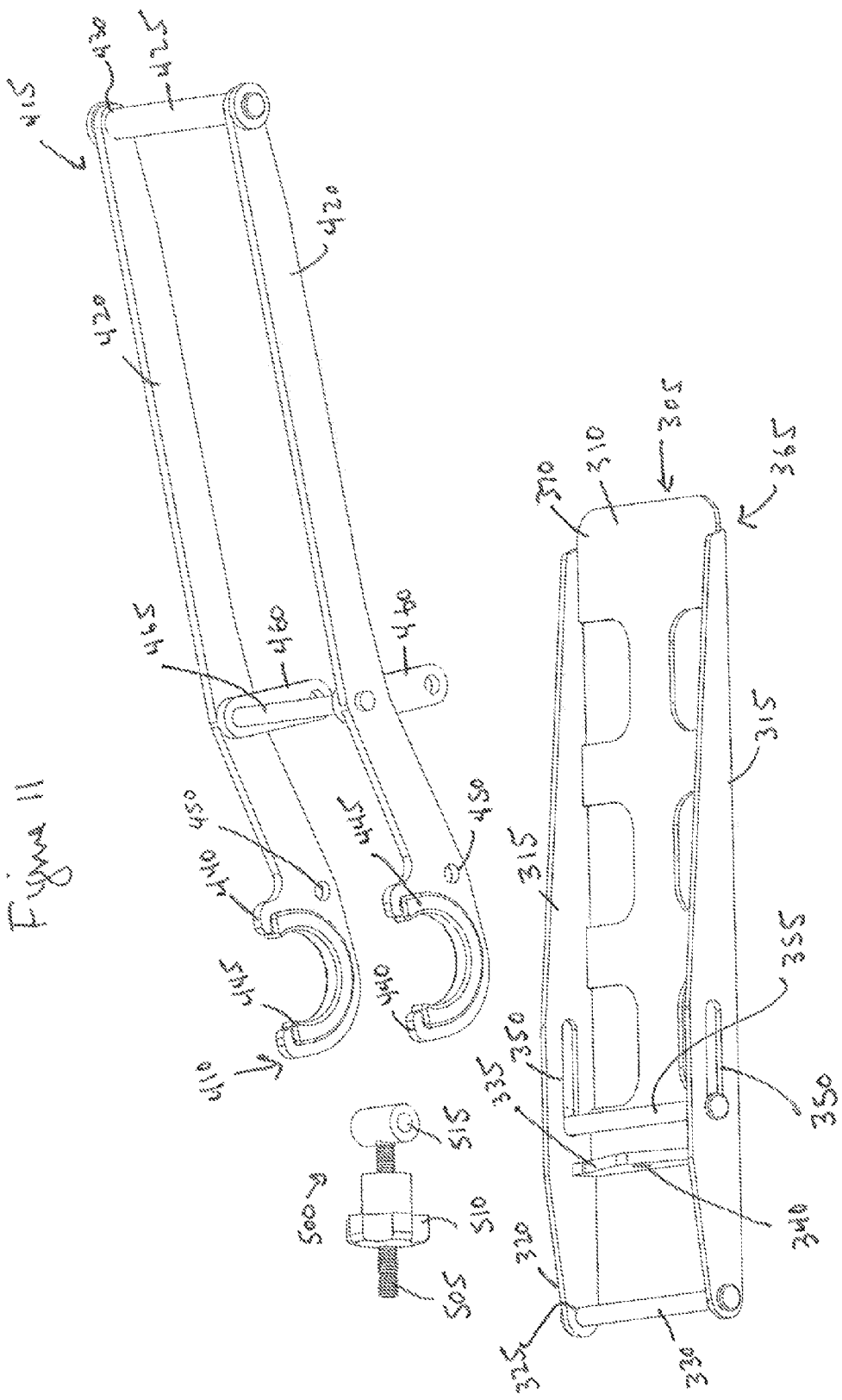

MOTORCYCLE WHEEL RAMP

BACKGROUND OF THE INVENTION

The present invention relates generally to re-installing the rear wheel on a motorcycle. More particularly, this invention pertains to a wheel ramp used with a motorcycle tire stand that aids the user when re-installing the rear tire on a motorcycle.

Re-installing the rear tire on a motorcycle is time consuming and is often a frustrating endeavor. During installation the axle, tire, spacers, chain, adjuster blocks, and brake caliper must all be properly aligned. It is extremely difficult for a single person to hold the tire at the proper height while also negotiating the aforementioned components. Typically, a motorcycle stand is used to lift the rear portion of the motorcycle off the ground. The user will sit on the ground directly behind the motorcycle with their feet underneath and between the rear tire and the ground. The user will then set the tire on top of their feet. As the user inserts the axle with their hand, the user will manipulate the height and lateral positioning of the tire with their feet while holding the brake caliper with their other hand. This is all done with the hope that the two spacers do not fall out of the wheel, which would require the user to start over. The present invention assists the user because it holds the tire allowing the user to adjust the tire height such that the components fit together more easily and the user can concentrate and focus more effectively on re-installing the tire.

BRIEF SUMMARY OF THE INVENTION

The present invention includes one or more embodiments directed to cover a wheel ramp for use with a motorcycle stand. A typical motorcycle stand includes a frame configured to be positioned on either side of a wheel of the motorcycle. And while the motorcycle stand lifts the motorcycle off of the ground it does not assist with the removal or replacement of the tire. The wheel ramp, in accordance with one or more embodiments of the invention, itself further aids the user by allowing the user to adjust and hold the tire in position for easy removal and re-installation thereof. The wheel ramp includes a pair of side plates, each of which has a first side end and a second side end distal to the first side end. At least one of the side plates has a curved end about the first side end to secure onto a portion of the frame of the motorcycle stand. The wheel ramp further includes a top plate secured between the pair of side plates. The wheel ramp also includes an adjustable height mechanism configured to adjust the height of the second end of the side plates and thus adjust the height of the top plate. The top plate is thus able to be moved under the wheel of the motorcycle and raised or lowered to engage and lift the wheel of the motorcycle into and out of engagement with the motorcycle.

In other aspects of the embodiments, the wheel ramp further includes a slot on at least one of the side plates configured to receive a slideable knob. The slideable knob extends from the adjustable height mechanism such that when the slideable knob moves along the slot, the adjustable height mechanism moves the height of the top plate.

In yet other aspects, at least one curved side end further includes one or more cushioned bumpers such that when attached to the motorcycle stand the wheel ramp does not scratch or damage the motorcycle stand. In addition thereto, each side plate may taper from the curved side end downwardly towards the second side end.

The height adjustment mechanism may take various forms, however, in one embodiment, the height adjustment mechanism includes a first link arm having a pair of first link ends distal to each other. One of the first link ends has an opening to receive a pin positioned through the slot and secured to the knob. The mechanism also includes a second link arm that has a pair of second link ends distal to each other. One of the second link ends is pivotally secured along a first pivot pin to the first link end distal to the pin. A first pivot bushing is positioned on the first pivot pin. The mechanism also includes a second pivot pin secured through the second side ends of the side plates and the second link end distal to the first pivot pin. The movement of the knob along the slot causes the first pivot bushing to move downwardly against a surface or upwardly away from the surface to force the second end of the side plates to raise off the surface or lower towards the surface. In addition thereto, a pair of second pivot bushings may be positioned on the second pivot pin separately between the side plates and the second link end distal to the first pivot pin, such that the pair of second pivot bushings roll when in contact with the surface.

In another embodiment of the present invention, there is provided a wheel ramp for use with a motorcycle stand. The wheel ramp, according to this embodiment, includes a top section, a base section and an adjustable height mechanism to move the top section relative the base section. The top section may have a top plate secured between a pair of top side plates. The top plate has a leading edge and a trailing edge and further defines a forward end and a rearward end. A first rod is positioned about the forward end between the pair of side plates, while a cross brace is positioned towards the leading edge of the top plate and between the pair of side plates. The cross brace includes a bore there through. A middle rod is slidably positioned within slots defined by each of the side plates. The base section has a pair of base side plates to define a forward section and a rearward section. The pair of base side plates are connected together by a base rearward rod positioned about the rearward section and further connected by a middle rod rotatably secured between the pair of base side plate. The pair of base side plates further have forward apertures to align with and secure about the first rod. At least one of the base side plates has a curved end about the forward section to hook onto the motorcycle stand. A pair of pivot arms extend from the middle rod. Each of the pivot arms include an end distal to the middle rod and further includes an aperture configured to secure onto the second rod positioned in the slots. The adjustable height mechanism has a threaded bolt secured on one end to the second rod positioned in the slots and further being threaded through the bore of the cross brace. A knob is positioned on the threaded bolt distal to the second rod and against the cross brace such that when the knob is turned the second rod is pushed away from or pulled towards the knob causing the top section to raise or lower relative the base section.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 5 is a perspective view of the underside of the wheel ramp;

FIG. 6 is a partial exploded view of the wheel ramp in accordance with an embodiment of the invention;

FIG. 7 is an exploded view of the wheel ramp in accordance with an embodiment of the invention;

FIG. 8 is a perspective view of a wheel ramp in accordance with another embodiment of the invention;

FIG. 9 is the wheel ramp from FIG. 1 illustrated from the bottom perspective;

FIG. 10 is an exploded view of the wheel ramp from FIG. 8; and

FIG. 11 is an exploded view of the wheel ramp From FIG. 9.

DETAILED DESCRIPTION OF THE INVENTION

Figure 1:
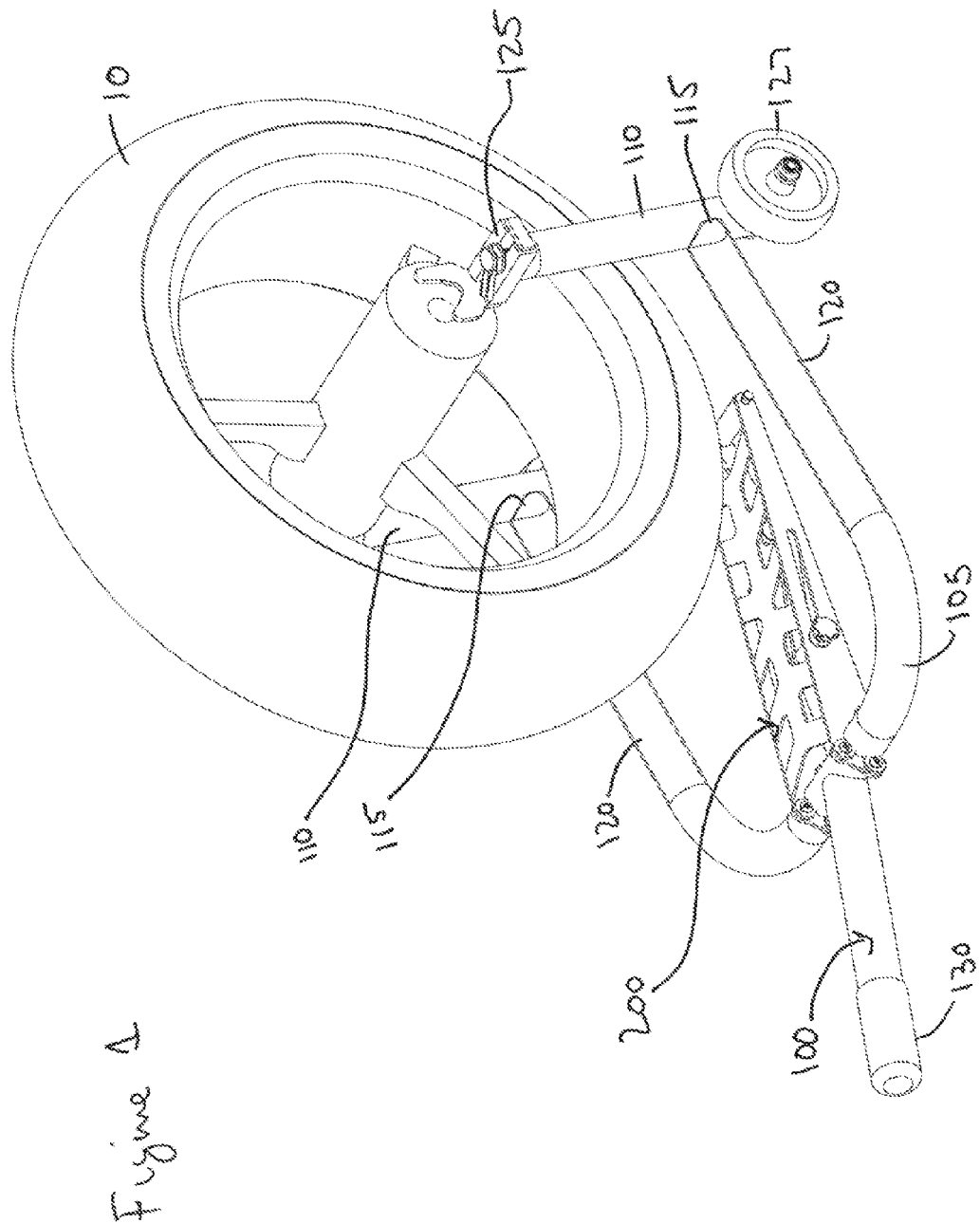
FIG. 1 is a perspective view of a wheel ramp in accordance with an embodiment of the invention illustrated when attached to a motorcycle stand.

While the invention is applicable to embodiments in many different forms, there are shown in the drawings and will be described in detail herein the various embodiments of the present invention. It should be understood, however, that the present disclosure is to be considered an exemplification of the principles of the invention and is not intended to limit the spirit or scope of the invention and/or claims of the embodiments illustrated.

The present invention is directed to a new device for lifting and positioning the rear wheel of a motorcycle when re-installing the rear wheel or tire 10. The wheel ramp fits onto a motorcycle stand and can easily be maneuvered such that the rear wheel can be properly positioned.

Figure 2:
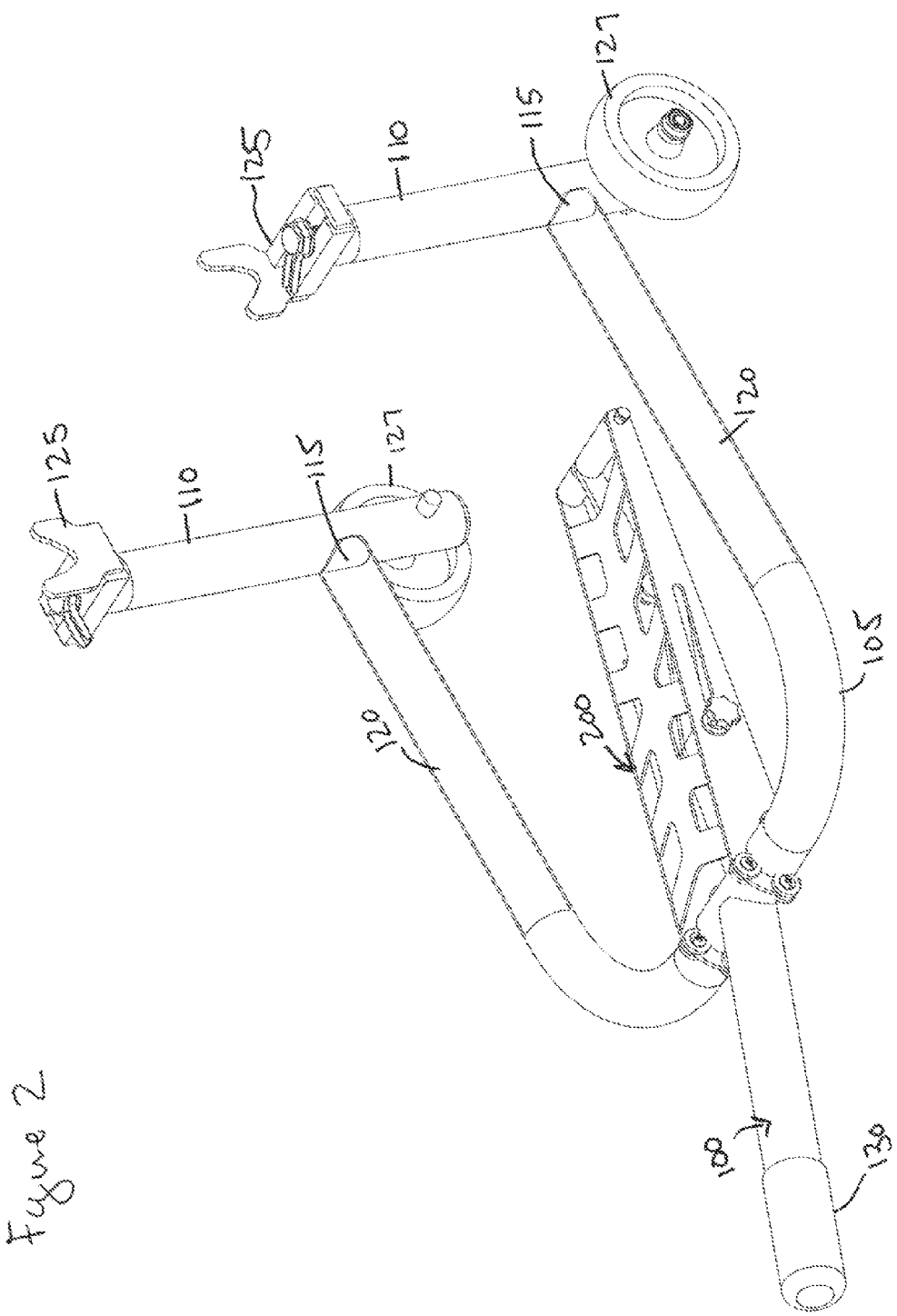
FIG. 2 is a perspective view of the wheel ramp and motorcycle stand.
Figure 3:
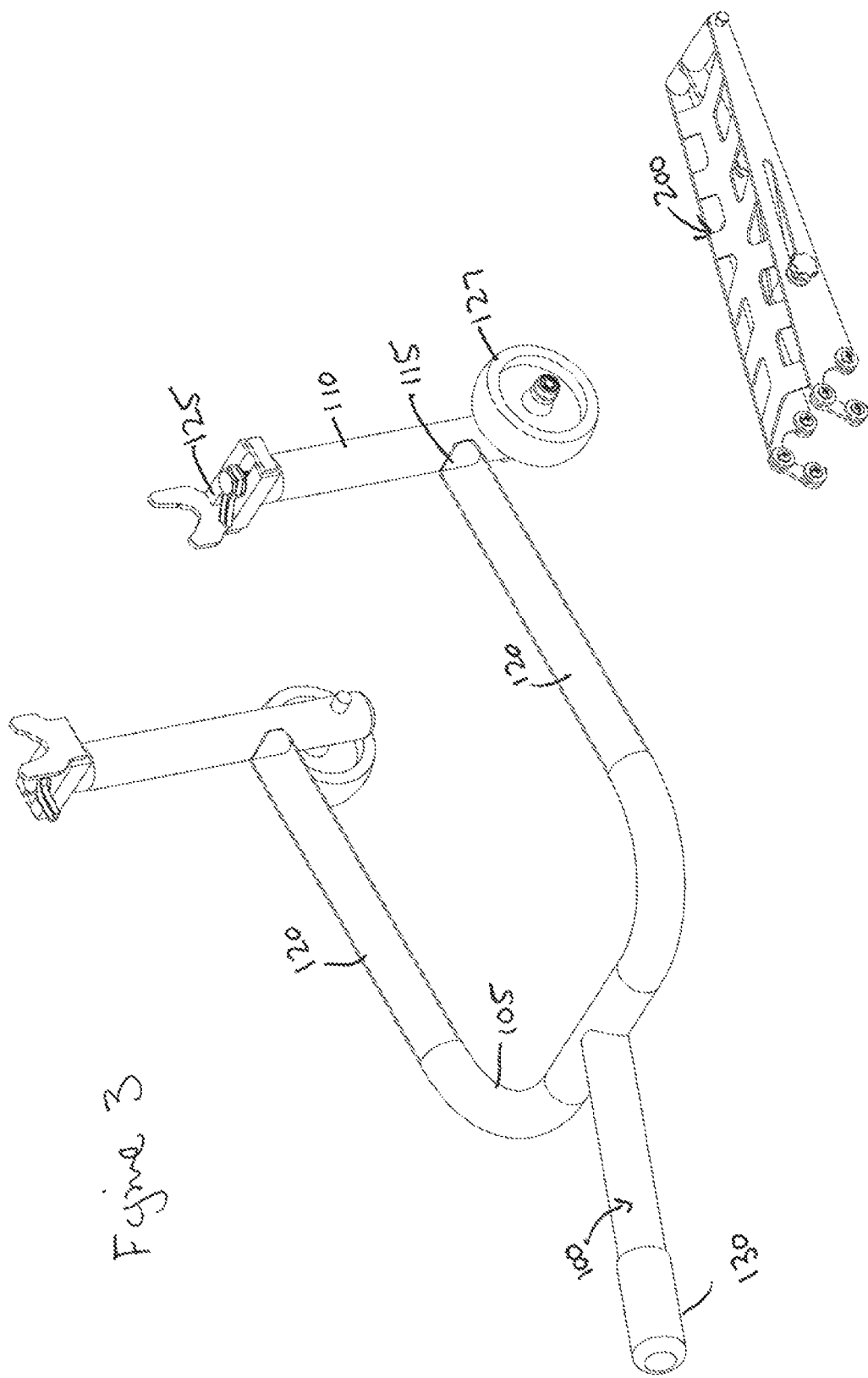
FIG. 3 is a perspective view of the wheel ramp unattached from the motorcycle stand.
Figure 4:
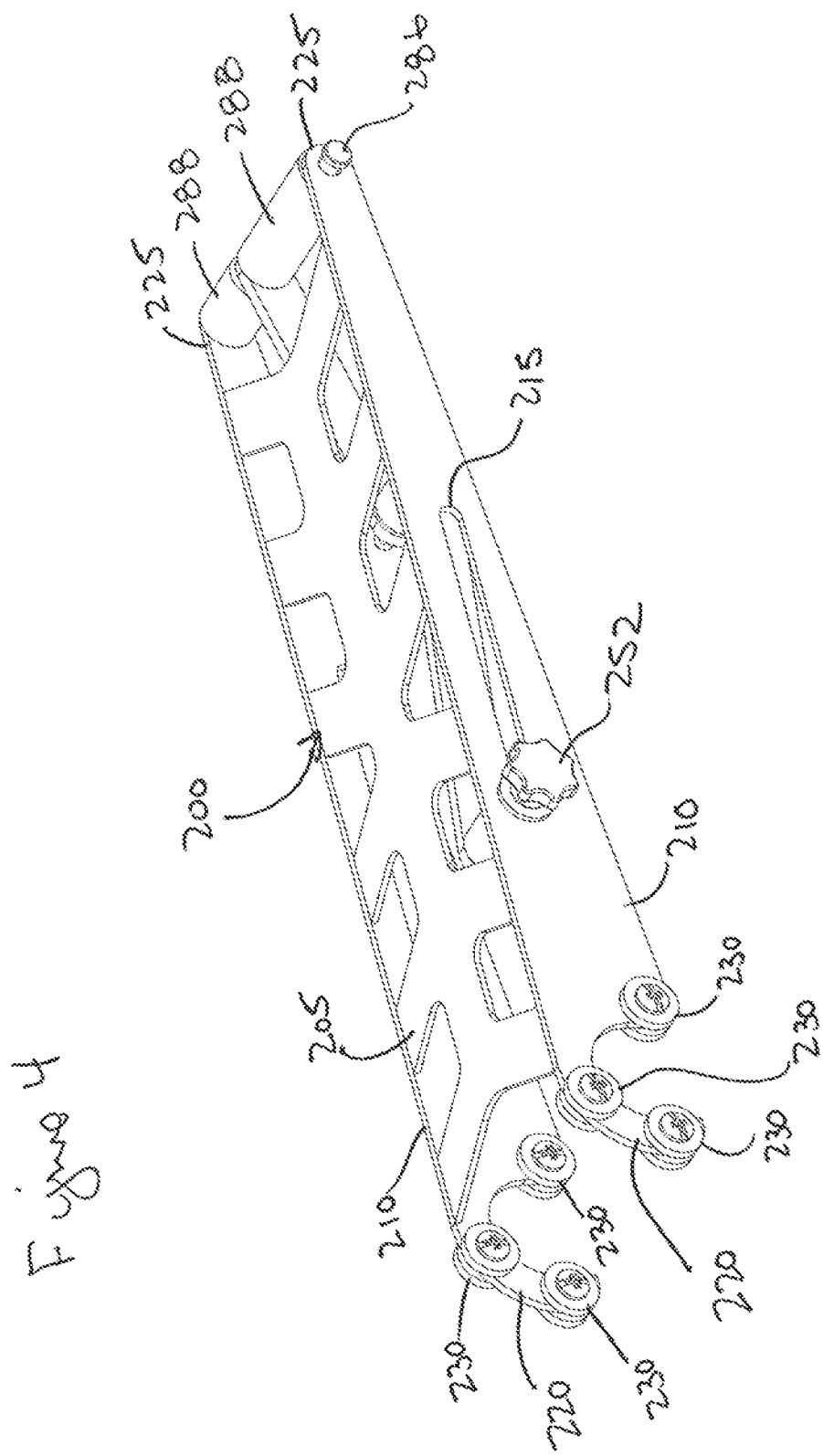
FIG. 4 is a perspective view of the wheel ramp in accordance with an embodiment of the invention.

Referring now to FIGS. 1 through 8, there is illustrated a motorcycle stand 100 in use with the inventive wheel ramp 200. The motorcycle stand 100 includes a U-shaped brace 105 that includes an arm 110 extending upwardly from the ends 115 on either side of the legs 120 defined by the brace 105. The U-shaped brace 105 has a lateral space configured to accommodate the width of the tire between the legs 120, such that the tire can be easily positioned between the legs. Each arm 110 terminates at a bracket 125 on one end, which is utilized to engage appropriate mating members of the motorcycle near the rear axle. The other end of the arm includes a wheel 127. A handle 130 is further provided and configured to extend from the top of the brace 105. Operation of the stand is accomplished by placing the stand under the motorcycle in behind the rear wheel. The brackets 125 are then aligned to engage the mating members of the motorcycle near the rear axle. To raise and support the motorcycle, the handle 130 is forced toward the ground and the rear end of the motorcycle is leveraged upward as the stand rolls on its wheels 127 until the handle 130 contacts the ground. It is important to note that as the brackets 125 engage the appropriate mating members of the motorcycle near the rear axle, this does not prevent the removal of the rear wheel. While the above is one illustration of a motorcycle stand it is not important to the aspect or scope of the invention to the wheel ramp. It is provided and illustrated as an exemplary stand used with the inventive wheel ramp, which is described in greater detail below.

The inventive wheel ramp 200 is an apparatus designed to assist in the changing of the rear wheel from a motorcycle frame by supporting the wheel weight while the axle and chain assemblies (not shown but typically provided on a motorcycle) are being disassembled or re-assembled. The wheel ramp 200 can clip to an existing motorcycle wheel stand or lift assembly. The wheel ramp 200 may be configured to adjust in height under the rear wheel to aid in the removal of the rear wheel or re-installation thereof.

The wheel ramp 200 includes a top plate 205 secured between a pair of side plates 210. Each side plate 210 includes a curved first end (such as a hook) 220 and a second end 225 distal to the curved first end. One or both of the side plates 210 may include a slot 215 positioned between the curved first end 220 and the second end 225. The side plates 210 are also tapered from the curved first end 220 towards the second end 225, meaning the curved first end is taller than the second end. The curved first end 225 may include one or more cushions 230, which may be made from a rubber or other elastic material, to allow the curved first end 220 to clip onto the wheel stand without scratching or causing damage to the wheel stand.

The wheel ramp 200 further includes a height adjustment mechanism 250 that is configured to lift the second end off the ground and thus easily lift or lower the rear wheel into position. The height adjustment mechanism 250 is defined by having a knob 252 with a pin 254 extending through the slot 215. A first washer 256 and second washer 258 may be provided and positioned on the pin on either side of the side plate to aid in locking and unlocking the height adjustment mechanism in a particular position. The user can simply twist the knob to either lock or unlock the height adjustment mechanism, this type of locking and unlocking is well known in various industries. The pin 254 is positioned through a first bushing 260 and is secured to a first link arm 262. The first link arm includes a pair of ends distal to each other, with one of the ends 264 being secured to the pin 254 and the other end 266 having a first link arm aperture 268. The first link arm 262 is then pivotally attached to a second link arm 270. The pivotal attachment between the two link arms is accomplished by having a link arm pivot pin 272 secured through the first link arm aperture 268 and through a corresponding second link arm aperture 274 defined on one end 276 of the second link arm 270. In one embodiment, a link arm bushing 278 is positioned along the link arm pivot pin 272 between the first and second link arms. The other end 280 of the second link arm 270 that is distal to the connection point of the two link arms includes an opening 282 that aligns with openings 284 positioned on the second end 225 of the slide plates 210. Once aligned an end pivot pin 286 inserts and secures the openings 282 and 284. A pair of end bushings 288 is positioned between each side plate 210 and the end 280 of the second link arm 270. The end bushings 288 would also rest on the surface and act as rollers when the height is adjusted or the wheel ramp is moved into position. During operation, the wheel ramp 200 is connected or hooked onto the motorcycle stand 100. The user can then position the top plate 205 under the wheel and slide the knob 252 along the slot 215 adjusting the height of the top plate 205. The sliding of the knob 252 causes the link arm bushing 278 to press against the surface raising the second end of the side plates off of the surface, which raises the top plate and thus the rear wheel. Once the rear tire is in position, it can then be easily re-installed.

In another embodiment of the present invention there is a wheel ramp 300 as illustrated in FIGS. 8 through 11. The wheel ramp 300 includes a top section 305 pivotally secured to a base section 405. An adjustable height mechanism 500 is included to allow the user to adjust the height of the top section relative to the base section.

The top section 305 includes a top plate 310 secured between a pair of top side plates 315. The top section 305 further includes a forward end 320 with a pair of apertures 325 positioned in each side plate 315 and sized to receive a first rod 330. The first rod 330 when positioned in the apertures may rotate therein. The top section 305 also includes a cross brace 335 positioned between the pair of top side plates 315. The cross brace 335 includes a bore 340. The cross brace 335 may be positioned towards a leading edge 345 of the top plate 310. Each of the side plates 315 has a slot 350 for receiving a second rod 355 that is configured to slide within the slot. In addition, the rearward end 360 of the top plate 310 may overhang the pair of side plate 315.

The base section 405 is defined to have a forward section 410 and a rearward section 415. The base section 405 includes a pair of base side plates 420 which are connected to each other at the rearward section 415 by a rearward rod 425 that is secured between the base side plates 420 through rearward apertures 430. The rearward rod 425 is positioned to sit on the surface when in use and could be further cushioned or made of a material that assists the user in maneuvering or positioning the wheel ramp about a surface.

The forward section 410 of each base side plate 420 includes a curved first end (such as a hook) 440. The curved first end 440 may include a cushion 445 inserted therein to allow the curved first end to clip onto the wheel stand without scratching or causing damage to the wheel stand. Each of the base side plates 420 include a forward aperture 450 for alignment with the first rod 330. When assembled the base section is pivotally secured about the forward apertures 450 to the top section.

Positioned between the forward aperture 450 and about a middle portion 452 of the base plate 405 are a pair of pivot arms 460 extending from a middle rod 465 pivotally secured to the base side plates 420. The ends 470 of the pivot arms 460 that are distal to the connection to the middle rod 465 include an aperture 475 configured to secure onto the second rod 355 that is positioned in the slots 350.

An adjustable height mechanism 500 is further provided to adjust the height of the top plate 310 relative the base plate 410. While the adjustable height mechanism 500 may take various forms, the present embodiment illustrates a threaded bolt 505 secured on one end to the second rod 355 and includes a knob 510 that is threaded onto the bolt 505. The adjustable height mechanism 500 may further include a cylinder 515 that secures around the second rod 355. When assembled, the threaded bolt 505 in inserted through the bore 340 on the cross brace 335 with the knob 510 positioned towards the first rod 330.

The overhang portion 370 in the top plate 310 can be positioned such that it overlaps the rearward rod 425 when the top plate 310 is moved to rest on the base plate defining a complete closed configuration.

When assembled, the user is able to turn the knob 510 which pulls or pushes the second rod 355 through the slots 350. As the second rod 355 moves it also adjusts the angle of the pivot arms 460 causing the rearward end 360 of the top plate 310 to move away from or towards the rearward section 415 of the base plate 410.

Various aspects of the invention are provided by having one or more of the following: (1) an adjustable inclined plane to allow apparatus to adjust to multiple motorcycle heights and styles; (2) snap on radius clip technology to allow apparatus to securely fit on existing motorcycle wheel lifts; (3) rubber mate clip material to allow for secure clip function without damaging existing motorcycle wheel lift pain or finish; (4) a sliding height adjustment mechanism to allow apparatus to quickly adjust to preferred tire height and lock in place; (5) sliding height adjustment mechanism to allow apparatus to quickly adjust to be removed or lowered with the use of one hand; (6) rolling spacer bushings to allow apparatus to roll easily on garage floor while attached to existing motorcycle lift; (7) rolling spacer bushings to allow apparatus to slide under motorcycle tire while attached to tire caddy if previously adjusted; and/or (8) an adjustable height maintained by a combination of cams, levers, linkages or screws.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is therefore intended to cover by the appended claims all such modifications within the scope of the appended claims.

We claim:

1. A wheel support for use with a motorcycle stand, the motorcycle stand having a substantially U-shaped frame with opposed legs defining a lateral space between the opposed legs, the opposed legs configured to position on either side of a wheel of the motorcycle, the wheel disposed within the lateral space, and a transverse portion extending between the opposed legs, the wheel support comprising:

a pair of side plates each having a first side end and a second side end distal to the first side end, at least one of the side plates having a curved end about the first side end, the curved end configured to secure onto the transverse portion of the frame of the motorcycle stand, the curved end comprising a concave curve opening downwardly such that the curved end is clippable over the transverse portion, the wheel support configured such that when the curved end is clipped over the transverse portion of the motorcycle stand, the wheel support is disposed within the lateral space and positioned under the wheel;

a top plate secured between the pair of side plates;

an adjustable height mechanism configured to adjust the height of the second end of the side plates and thus adjust the height of the top plate about the second end, from a lowered position to a raised position, whereby the top plate when positioned under the wheel of the motorcycle in use of the wheel support is movable from the lowered position to the raised position, such that in the raised position the top plate engages with and supports the wheel of the motorcycle, and wherein at least one of the side plates includes a slot configured to receive a slideable knob, the slideable knob extending from the adjustable height mechanism such that when the slideable knob moves along the slot, the adjustable height mechanism moves the height of the top plate;

and wherein the height adjustment mechanism includes:

a first link arm having a pair of first link ends distal to each other, one of the first link ends having an opening to receive a pin positioned through the slot and secured to the knob;

a second link arm having a pair of second link ends distal to each other, one of the second link ends is pivotally secured along a first pivot pin to the first link end distal to the pin, a first pivot bushing positioned on the first pivot pin; and a second pivot pin secured through the second side ends of the side plates and the second link end distal to the first pivot pin, and wherein movement of the knob along the slot causes the first pivot bushing to move downwardly against a surface and upwardly away from the surface to force the second ends of the side plates to raise off the surface and lower towards the surface.

2. The wheel support of claim 1 further comprising a pair of second pivot bushings positioned on the second pivot pin separately between the side plates and the second link end distal to the first pivot pin, and wherein the pair of second pivot bushings roll when in contact with the surface.

3. A wheel ramp for use with a motorcycle stand, the motorcycle stand having a frame with opposed legs configured to position on either side of a wheel of the motorcycle and a transverse portion extending between the opposed legs, the wheel ramp comprising:

a pair of side plates each having a first side end and a second side end distal to the first side end, at least one of the side plates having a curved end about the first side end, the curved end configured to secure onto the transverse portion of the frame of the motorcycle stand, the curved end comprising a concave curve opening downwardly such that the curved end is clippable over the transverse portion;

a top plate secured between the pair of side plates;

an adjustable height mechanism configured to adjust the height of the second end of the side plates and thus adjust the height of the top plate about the second end, whereby the top plate when moved under the wheel of the motorcycle is movable to engage and lift the wheel of the motorcycle into and out of engagement with the motorcycle and wherein the adjustable height mechanism includes: (a) a first link arm having a pair of first link ends distal to each other, one of the first link ends having an opening to receive a pin positioned through a slot on one of the side plates and secured to a knob, (b) a second link arm having a pair of second link ends distal to each other, one of the second link ends is pivotally secured along a first pivot pin to the first link end distal to the pin, a first pivot bushing positioned on the first pivot pin, and (c) a second pivot pin secured through the second side ends of the side plates and the second link end distal to the first pivot pin, whereby movement of the knob along the slot causes the first pivot bushing to move downwardly against a surface and upwardly away from the surface to force the second ends of the side plates to raise off the surface and lower towards the surface.

4. The wheel ramp of claim 3, wherein the concave curve further includes one or more cushioned bumpers.

5. The wheel ramp of claim 3, wherein each side plate tapers from the curved end downwardly towards the second side end.

6. The wheel ramp of claim 3 further comprising a pair of second pivot bushings positioned on the second pivot pin separately between the side plates and the second link end distal to the first pivot pin, and wherein the pair of second pivot bushings roll when in contact with the surface.

7. A wheel ramp for use with a motorcycle stand, the motorcycle stand having a frame with opposed legs configured to position on either side of a wheel of the motorcycle, and a transverse portion extending between the opposed legs, the wheel ramp comprising:

a top section pivotally secured to a base section and having an adjustable height mechanism configured to adjust the height of the top section relative to the base section, and wherein, the top section defined to include:
a pair of top side plates defined to have a forward end and a rearward end, each of the pair of top side plates further having a slot,
a top plate secured between the pair of top side plates, the top plate having a leading edge and a trailing edge,
a first rod positioned about the forward end between the pair of top side plates,
a cross brace positioned towards the leading edge of the top plate between the pair of top side plates, wherein the cross brace includes a bore there through, and
a second rod configured to slide in the slots defined by the pair of top side plates;

the base section defined to include:
a pair of base side plates defining a forward section and a rearward section, the base side plates being connected to each other about the rearward section by a base rearward rod, and wherein at least one of the base side plates has a curved end about the forward section to hook onto the motorcycle stand, the curved end comprising a concave curve opening downwardly such that the curved end is hookable over the transverse portion; the base side plates having forward apertures to align with and secure about the first rod, a pair of pivot arms extending from a middle rod rotatably secured between the pair of base side plates, each of the pivot arms includes an end distal to the middle rod and further includes an aperture configured to secure onto the second rod positioned in the slots; and the adjustable height mechanism defined to include:

a threaded bolt being secured on one end to the second rod positioned in the slots and further being threaded through the bore of the cross brace, a knob is positioned on the threaded bolt and distal to the second rod such that when the knob is turned the second rod is pushed away from or pulled towards the knob causing the top section to raise or lower relative the base section.

8. The wheel ramp of claim 7, wherein the at least one curved end includes a cushioned bumper.

9. The wheel ramp of claim 7, wherein both base side plates have a curved end.

10. The wheel ramp of claim 7, wherein the trailing edge of the top plate is configured to rest over the rearward rod when the wheel ramp is in a closed configuration.

11. A wheel ramp for use with a motorcycle stand, the motorcycle stand having a frame with opposed legs configured to position on either side of a wheel of the motorcycle, and a transverse portion extending between the opposed legs, the wheel ramp comprising:

a top section having a top plate secured between a pair of top side plates, the top plate having a leading edge and a trailing edge, and further defining a forward end and a rearward end, a first rod positioned about the forward end between the pair of top side plates, a cross brace positioned towards the leading edge of the top plate and between the pair of top side plates, wherein the cross brace includes a bore there through, and a second rod slidably positioned within slots defined by each of the top side plates;

a base section having a pair of base side plates defining a forward section and a rearward section, the pair of base side plates being connected together by a base rearward rod positioned about the rearward section and further connected by a middle rod rotatably secured between the pair of base side plate, the pair of base side plates further having forward apertures to align with and secure about the first rod, at least one of the base side plates has a curved end about the forward section to hook onto the motorcycle stand, the curved end comprising a concave curve opening downwardly such that the curved end is hookable over the transverse portion, and a pair of pivot arms extending from the middle rod, each of the pivot arms includes an end distal to the middle rod and further includes an aperture configured to secure onto the second rod positioned in the slots; and an adjustable height mechanism having a threaded bolt being secured on one end to the second rod positioned in the slots and further being threaded through the bore of the cross brace, a knob is positioned on the threaded bolt and distal to the second rod such that when the knob is turned the second rod is pushed away from or pulled towards the knob causing the top section to raise or lower relative the base section.

12. The wheel ramp of claim 11, wherein both base side plates have a curved end.

13. The wheel ramp of claim 12, wherein the curved ends include a cushioned bumper.

14. The wheel ramp of claim 11, wherein the trailing edge of the top plate is configured to rest over the rearward rod when the wheel ramp is in a closed configuration.

\* \* \* \* \*